United States Patent [19]

Chi

[11] Patent Number: 5,575,540

[45] Date of Patent: Nov. 19, 1996

[54] HUB OF A BICYCLE

[76] Inventor: Yi C. Chi, No. 139-5, An Mei Rd., Mei Shan Tsun Hou Li Hsiang, Taichung Hsien, Taiwan

[21] Appl. No.: 526,383

[22] Filed: Sep. 11, 1995

[51] Int. Cl.⁶ .................................................. B60B 27/00
[52] U.S. Cl. ........................................ 301/110.5; 384/545
[58] Field of Search .............................. 301/110.5, 110.6, 301/124.2; 192/64; 384/545; 74/594.1, 594.2

[56] References Cited

U.S. PATENT DOCUMENTS

| | | | |
|---|---|---|---|
| 4,810,040 | 3/1989 | Chi | 301/110.5 |
| 5,002,407 | 3/1991 | Chi | 301/110.5 |
| 5,460,455 | 10/1995 | Chen | 384/545 |
| 5,476,327 | 12/1995 | Chiang | 384/545 |

Primary Examiner—David M. Mitchell
Assistant Examiner—Hoa B. Trinh
Attorney, Agent, or Firm—Morton J. Rosenberg; David I. Klein

[57] ABSTRACT

A hub of a bicycle includes a hub shell with two ends and an axle which rotatably extends through the hub shell, a dust cap threadedly engaged to each end of said hub shell, a bearing rotatably disposed between the axle and each of the dust caps, a tubular element mounted to the axle and located between two first flanges each of which extends radially and outwardly from the axle, the tubular element having a fourth groove defined in an outer periphery of at least one end thereof so as to form a first shoulder and a second shoulder wherein the first shoulder is located near a distal end of the tubular element and is received in the third groove of the corresponding dust cap, the second shoulder having a second flange extending inwardly and radially therefrom for contacting against the corresponding first flange of the axle.

3 Claims, 2 Drawing Sheets 5,575,540

HUB OF A BICYCLE

FIELD OF INVENTION

The present invention relates to a hub and more particularly to a hub of a bicycle, which has an advantage of being assembled easily.

RELATED PRIOR ART

Referring to FIG. 1, a conventional hub of a bicycle includes an axle 20 which has a first, end and a second end and is rotatably received in a hub shell 10, the hub shell 10 has a first end and a second end and a threaded portion 11 is defined in an inner periphery of each of the first end and the second end. A flange 23 extends radially from an outer periphery of each of the first end and the second end of the axle 20, each of the flanges 23 has a groove 21 defined in an outer periphery thereof. A first dust cap 30 and a second dust cap 31 are respectively threadedly engaged to the respective threaded portion 11 of the hub shell 10, each of the first dust cap 30 and the second dust cap 31 has the inner grooves 32/33 defined in an inner periphery thereof for a plurality of balls 22 being received between the grooves 21 of the flanges 23 and the inner grooves 32/33 of the first dust cap 30 and the second dust cap 31 such that the axle 20 is rotatably received in the hub shell 10. A tubular element, 40 is mounted to the axle 20 between the two flanges 23, the tubular element 40 is designed to prevent dust from entering an interior of the hub shell 10.

When assembling, a manufacturer must put every element mentioned above into the hub shell 10 one by one, this means he/she takes a lot of time to collect the elements together and puts these elements in a certain order into the hub shell 10. Furthermore, the manufacturer cannot make sure the relative structural relationships between these elements which are engaged within the hub shell 10 is correct, especially the very position of the balls 22. Also, these elements could be lost when collecting each of them beside the production line.

The present invention intends to provide a hub of a bicycle, which most of the elements thereof can be engaged together before being engaged in the hub shell and thus mitigates and/or obviates the above mentioned problems.

SUMMARY OF THE INVENTION

The present invention provides a hub of a bicycle, the hub includes a hub shell with two ends and an axle which rotatably extends through the hub shell by disposing two bearings therebetween, a dust cap threadedly engaged to each end of the hub shell, a tubular element mounted to the axle and located between two first, flanges each of which extends radially and outwardly from the axle, at least one end of the tubular element having a fourth groove defined in an outer periphery thereof so as to form a first shoulder and a second shoulder to define the fourth groove wherein the first shoulder located near a distal end of the tubular element, the first shoulder being received in the third groove of the corresponding dust cap and the second shoulder having a second flange extending inwardly and radially therefrom for contacting against the corresponding first flange of the axle.

It is an object of the present invention to provide a hub of a bicycle wherein the elements composed of the hub can be assembled before being engaged in a hub shell of the hub.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
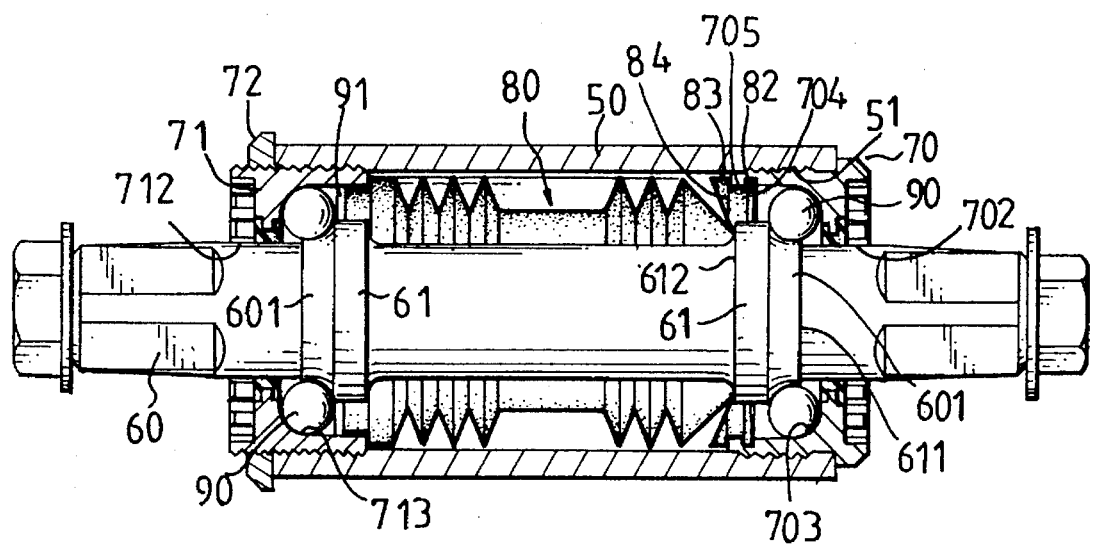
FIG. 3 is a side elevational view, partly in section, of the hub in accordance with the present invention.
Figure 1:
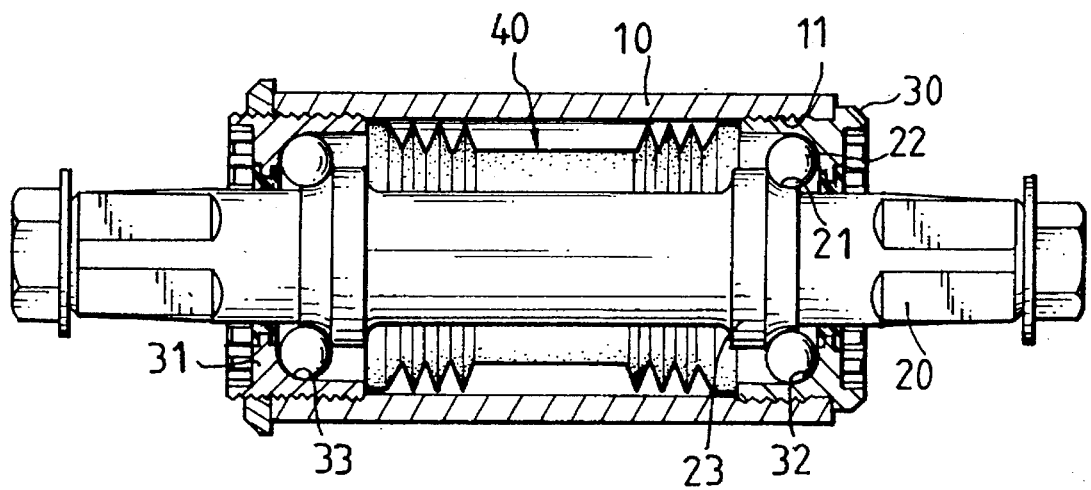
FIG. 1 is a side elevational view, partly in section, of a conventional hub.
Figure 2:
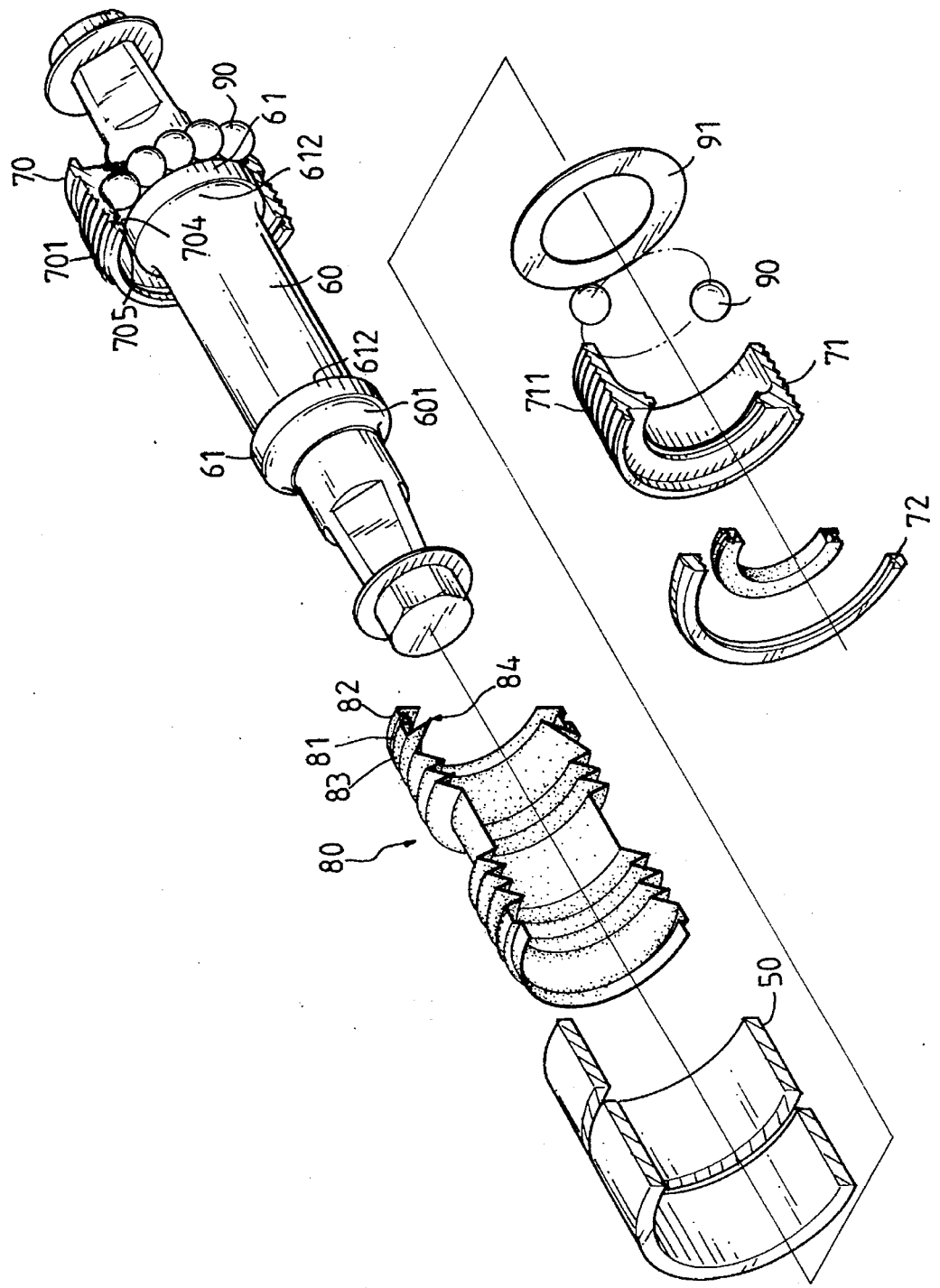
FIG. 2 is an exploded view of a hub of a bicycle in accordance with the present invention.

Referring to FIGS. 2 and 3, a hub of a bicycle in accordance with the present invention generally includes a hub shell 50, an axle 60, a first dust cap 70, a second dust cap 71 and a tubular element 80, the hub shell 50 having a first end and a second end, each of the first end and the second end thereof having a threaded portion 51 defined in an inner periphery thereof. The axle 60 has a first end and a second end, each of the first end and the second end thereof having a first flange 61 extending radially therefrom, each of the first flanges 61 having a first side 611 and a second side 612 and having a first groove 601 defined in an outer periphery thereof near the first side 611.

The first dust cap 70 and a second dust cap 71, each having a tubular portion extending therefrom which has an outer threaded portion 701, 711 defined in an outer periphery thereof for being threadedly engaged with the corresponding threaded portion 51 of the hub shell 50, each of the first dust cap 70 and the second dust cap 71 having a hole 702, 712 defined centrally therein for the axle 60 extending therethrough. Each of the first dust cap 70 and the second dust cap 71 has a second groove 703, 713 defined in an inner periphery of the tubular portion thereof for a plurality of balls 90 (bearing) rotatably received between the two first grooves 601 and the second grooves 703, 713 such that the axle 60 is rotatably received in the hub shell 50. The first dust cap 70 further has a third groove 704 defined in the inner periphery of the tubular portion near a distal end of the tubular portion.

The tubular element 80 has a first end and a second end, the first end thereof having a fourth groove 81 defined in an outer periphery thereof so as to form a first shoulder 82 and a second shoulder 83, both of the two shoulders 82, 83 define the fourth groove 81, wherein the first, shoulder 82 located near the first end of the tubular element 80, the first shoulder 82 being received in the third groove 704 of the first dust cap 70, the second shoulder 83 having a second flange 84 extending inwardly and radially therefrom to contact against the second side 612 of the first flange 61 near the first end of the axle 60.

The first dust cap 70 has a block portion 705 formed inwardly and radially on an distal end of the tubular portion thereof and the block portion 705 is defined by the third groove 704, the block portion 705 is received in the fourth groove 81 of the tubular element 80 of the first dust cap 70.

When assembling, the balls 90, the first dust cap 70 and the tubular element 80 are engaged to the axle 60 in advance to form an assembled part such that the balls 90 are rotatably received between the first dust cap 70 and the first flange 61, the tubular element 80 is securely engaged to the first dust cap 70 and has a feature of preventing the axle 60 from being disengaged from the first dust cap 70. The manufacturer engages the assembled part to the hub shell 50 by threading the first dust cap 70 to the first end of the hub shell 50, and then a ring element 91 is mounted to the first flange 61 near the second end of the axle 60, the second dust cap 71 and a fixing ring 72 are mounted to the second end of the axle 60 and the second dust cap 71 is threaded to the second end of the hub shell 50 wherein a plurality of balls 90 are received between the second groove 713 of the second dust cap 71 and the first groove 601 of the first flange 61 near the second end of the axle 60.

Therefore, the present invention provides an advantage which allows the first dust cap 70, the balls 90 and the tubular element 80 to be assembled together before they are engaged to the hub shell 50, this is important for the manufacturer to assemble the hub because the position of the balls 90 received between the first groove 601 and the second groove 703 of the first dust cap 70 is set such that the manufacturer only rotates the second dust cap 71 thus he or she can accurately dispose the balls 90 in position and the accuracy of assembling is therefore increased. Furthermore, because some elements are assembled in advance, elements management is easier than that of the conventional way mentioned above.

Although the invention has been explained in relation to its preferred embodiment, it is to be understood that many other possible modifications and variations can be made without departing from the spirit and scope of the invention as hereinafter claimed.

I claim:

1. A hub of a bicycle and comprising:

a hub shell having a first end and a second end, each of said first, end and said second end having a threaded portion defined in an inner periphery thereof;

an axle having a first end and a second end, each of said first end and said second end thereof having a first, flange extending radially therefrom, each of said first flanges having a first side and a second side and having a first groove defined in an outer periphery thereof near said first side;

a first dust cap and a second dust cap, each having a tubular portion extending therefrom and each of said tubular portions having an outer threaded portion defined in an outer periphery thereof for being threadedly engaged with said corresponding threaded portion of said hub shell, each of said first dust cap and said second dust cap having a hole defined centrally therein for said axle extending therethrough, each of said first dust cap and said second dust cap having a second groove defined in an inner periphery of said tubular portion thereof for a plurality of balls rotatably received between said first grooves of said axle and said second grooves, said first dust cap having a third groove defined in said inner periphery of said tubular portion and located near a distal end of said tubular portion, and a tubular element having a first end and a second end, said first end thereof having a fourth groove defined in an outer periphery thereof so as to form a first shoulder and a second shoulder to define said fourth groove wherein said first shoulder being located near said first end of said tubular element and being received in said third groove of said first dust cap, said second shoulder having a second flange extending inwardly and radially therefrom for contacting against said second side of said first flange near said first end of said axle.

2. The hub as claimed in claim 1 wherein said first dust cap has a block portion formed inwardly and radially on a distal end of said tubular portion thereof and said block portion defined by said third groove, said block portion being received in said fourth groove of said tubular element.

3. The hub as claimed in claim 1 wherein a ring element mounted to said axle between said first flange near said second end of said axle.

* * * * *